United States Patent
Falk

(10) Patent No.: US 7,432,850 B2
(45) Date of Patent: Oct. 7, 2008

(54) WIDEBAND RADAR

(75) Inventor: Kent Falk, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 3 days.

(21) Appl. No.: 11/577,219

(22) PCT Filed: Oct. 13, 2004

(86) PCT No.: PCT/SE2004/001460

§ 371 (c)(1),
(2), (4) Date: Apr. 13, 2007

(87) PCT Pub. No.: WO2006/041338

PCT Pub. Date: Apr. 20, 2006

(65) Prior Publication Data

US 2007/0247351 A1    Oct. 25, 2007

(51) Int. Cl.
G01S 13/58 (2006.01)
G01S 13/532 (2006.01)

(52) U.S. Cl. ..................... 342/110; 342/109
(58) Field of Classification Search .................. 342/104, 342/107, 109, 110, 128
See application file for complete search history.

(56) References Cited

U.S. PATENT DOCUMENTS 5,724,041 A * 3/1998 Inoue et al. ................. 342/70
6,121,915 A * 9/2000 Cooper et al. ............... 342/70

OTHER PUBLICATIONS

Dawood, M. et al, "Generalised wideband ambiguity function of a coherent ultrawideband random noise radar" Radar, Sonar and Navigation, IEE Proceedings—vol. 150, Issue 5, Oct. 2, 2003 pp. 379-386 Digital Object Identifier 10.1049/ip-rsn:20030702.*

* cited by examiner

*Primary Examiner*—Ian J Lobo
(74) *Attorney, Agent, or Firm*—Roger S. Burleigh

(57) ABSTRACT

The invention refers to a method and device for wideband radar, the method comprising: —generating a wideband signal (1, 6) with a bandwidth B; —copying the wideband signal (1, 6); —transmitting the wideband signal (6'); —receiving a returned echo signal (11) from the transmitted signal (6'); —dividing the copied signal into a number, $N_f$, of subsequent frequency bands b; —manipulating the copied and divided signal into an anticipated signal (10) by adding a number $N_d$ of anticipated delays and a number of $N_D$ Doppler stretches to the copied and divided signal for each $N_f$ subsequent frequency band b; —dividing the received signal (17) into a number, $N_f$, of subsequent frequency bands b; —correlating corresponding frequency bands in the divided received signal (17) and the anticipated signal (10) giving $N_d N_D$ correlated signals (19) for determining range (R) to a target and velocity (v) of the target.

13 Claims, 2 Drawing Sheets

WIDEBAND RADAR

TECHNICAL FIELD

The invention refers to a method and device for wideband radar. The method comprises:
generating a wideband signal with a bandwidth B;
transmitting the wideband signal;
receiving a returned echo signal from the transmitted signal, and;
manipulating the stored signal for an estimate of the echo return for range and velocity.

BACKGROUND ART

In the field of wideband radar systems it is known that range resolution is inversely proportional to the bandwidth used for the radar. Furthermore, it is known that velocity resolution depends inversely on integration of time. A challenge in the design of broadband radar systems is to achieve velocity resolution as good as the range resolution. The range resolution is normally better than required.

Problems with existing solutions are low velocity resolution compared with the range resolution. There is also a problem with a high jamming sensitivity since it is not possible to exclude jammed parts of the frequency band. Furthermore, there is also a problem with high dynamic range requirements in the A/D-converters since jammed parts of the used frequency band cannot be excluded before the A/D-converter and the dynamic range in the A/D-converters must be able to handle the level of the jamming signal.

There is thus a need for an improved method and device for wideband radar.

DISCLOSURE OF INVENTION

The invention aims to remedy the above stated problem by a method and a device as stated below. The method is intended to be implemented in a radar system using a wideband signal, with bandwidth B. Examples of radar using a wideband signal are Noise Radar and chirp pulse radar. The invention uses a signal generator for generating the wideband signal. The signal is copied and advantageously stored in a memory. The wideband signal is also transmitted by a sending antenna. The returned echo signal is received and amplified. Both the transmitted and received signal is divided into $N_f$ subsequent frequency bands b. The frequency bands b may have equal bandwidth $B/N_f$, but may also have different bandwidth. Suitable means for dividing the stored and received signal into frequency bands is a filter bank for analog signals or digital filters in case the stored and received signals have been converted into digital signals.

The return echo signal is delayed because of the transmitted signal making a round-trip propagating to a target and back to a receiving antenna. The transmitted signal also undergoes a Doppler Stretching when reflected by the target, due to the motion of the target, and becomes part of the return signal. When using a narrow band approximation, the Doppler Stretching becomes a Doppler frequency shift.

The stored and divided signal is being manipulated such that anticipated delays and Doppler stretches are added to the stored signal for each $N_f$ frequency band b. This manipulated signal is hereinafter called the anticipated signal and refers to one signal and thus one filter for each delay (i.e. a number of $N_d$ filters), and one signal and thus one filter for each Doppler stretch (i.e. a number of $N_D$ filters).

The method comprises the step of correlating corresponding frequency bands b in the divided received signal and the anticipated signals, i.e. the $N_d$ delayed and the $N_D$ Doppler stretched copies of the transmitted signal are correlated with the received signal. This results in a number of $N_d N_D$ ($N_d$ times $N_D$) correlated signals representing each combination of delay and Doppler stretch. This procedure takes place in a correlator means comprising a correlation cluster giving the $N_d N_D$ correlated signals. The output from the correlator cluster yields a high value if an anticipated signal is matched with a similar return signal and a low value if there is a mismatch. Here, match refers to two signals being identical or similar. In some literature, the term "match" or "correlated" refers to a probability or probability function describing the probability of a target hit, i.e. the probability of finding a target at a range R with velocity v at a certain moment in time. The output from the correlator means is a number of correlated signals describing a range R and velocity v plane, and amplitudes in a direction orthogonal to the R and v plane. The amplitudes describe the high and low values in the correlated signal, i.e. if there is a match or nor. If there is a match the anticipated scenario for a target hit is identical or at least similar to the return signal from a target hit. The correlated signals thus give an output revealing the range R and velocity v of a target.

In one embodiment of the invention, the $N_d N_D$ correlated signals are then averaged into a number of $N_f$ averaged signals in order to give a good estimate of the echo return for each range/delay and velocity/Doppler stretch combination. The range, delay and Doppler Stretch is dependent on each other according to:

$$T(t) = \frac{2vt}{c} + \frac{2R(0)}{c}$$

where T(t) refers to delay time which depends on the range R and where R(0) is equal to the range at time t=0, and where v is equal to the target radial velocity and c is equal to the speed of light, and where $$\frac{2vt}{c}$$

refers to the Doppler Stretch.

The benefits of the invention will be discussed below.

In order to explain the invention further, a theoretical example will now be given. Starting from fairly general assumptions, the range resolution $\Delta R$ in radar is reciprocally proportional to the bandwidth B and the velocity resolution $\Delta v$ is reciprocally proportional to the time for measurement T.

$$\Delta R \cong \frac{1}{B} \quad (1)$$

$$\Delta v \cong \frac{1}{T} \quad (2)$$

Furthermore, the product of ΔR and Δv is generally constant for a fix center frequency.

$$\Delta R \cdot \Delta v = C \quad (3)$$

Where C is a constant.

If the bandwidth B is divided into $N_b$ equal parts with the bandwidth b. (The parts need not be equal, but it facilitates the below discussion.)

$$b = \frac{B}{N_b} \quad (4)$$

According to equation 1, the range resolution ΔR will thus increase with a factor $N_b$. Since it is possible to create a mean value over a number of $N_b$ measurements, i.e. one measurement for each part with a bandwidth b, the range resolution is improved with a factor equal to the square root of $N_b$. The resulting range resolution $\Delta R_b$ thus becomes:

$$\Delta R_b = \frac{N_b \cdot \Delta R}{\sqrt{N_b}} = \sqrt{N_b} \cdot \Delta R \quad (5)$$

Equation 3 now gives that the velocity resolution Δv is improved with a factor equal to the square root of $N_b$. The resulting velocity resolution in $\Delta v_b$ thus becomes:

$$\Delta v_b = \frac{\Delta v}{\sqrt{N_b}} \quad (6)$$

The desired improvement of velocity resolution has now been achieved at the expense of a lessened range resolution.

It is of course also possible to achieve the reverse effect. By dividing the time for measurement T into $N_t$ parts, each with the length t, the range resolution will then be improved at the expense of a lessened velocity resolution according to:

$$\Delta R_t = \frac{\Delta R}{\sqrt{N_t}} \quad (7)$$

$$\Delta v_t = \sqrt{N_t} \cdot \Delta v \quad (8)$$

End of example.

In one embodiment of the invention, the averaged signals are put through a detector means. The simplest form of a detector means may be described as a threshold circuit that gives logical "LOW" output below the threshold level and a logical "HIGH" output above the threshold level. A "LOW" output indicates large probability for "no target present" and a "HIGH" output indicates large probability for "target present". Furthermore, a detector may also give target size information by using different threshold levels for different target sizes.

In one embodiment of the invention, the detected signals are processed in a logic means where the range (R) to a target and velocity (v) of the target is determined. The logic circuit reports for which range/velocity combinations there is high probability for a target.

In one embodiment of the invention, the divided received signal is transmitted through a switch cluster comprising a number of $N_f$ switches for clearing a signal that is evidently wrong in order to reduce interference from both intentional and unintentional jamming. For example, all jammed frequency sub bands will be excluded in the calculation of the average value by opening the correct switches in the switch cluster.

One advantage of this procedure is that all jammed frequency sub bands will be excluded in the calculation of the average value. For example, a 1 bit A/D converter may be used and the procedure excluding jammed parts of the frequency band gives graceful degradation.

The present invention has the advantage of gaining velocity resolution at the price of reduced range resolution, but where the range resolution still is good enough for detecting moving targets such as air planes etc. The invention also gives a system with high immunity against interference and reduced dynamic range requirements in the A/D-converters.

Other advantages of the Invention are:
Independent range and velocity resolution since there is no cross-correlation between range and velocity resolution.
Constant level contours in the ΔR-Δv plane are ellipses with main axes that coincide with the coordinate axes.
Low jamming sensitivity.
Low dynamic range requirements in the A/D-converters since the A/D-converters doesn't need to handle jamming. Simulation shows that only a few decibels are lost when 1-bit A/D-converters are compared with infinite resolution.
Low sampling rate in the A/D-converters since only a fraction of the total frequency band is handled in each A/D-converter.
Low probability of detection since the output power is spread over a large frequency band and in the continuous wave case over all available time.
Low probability of intercept since low probability of detection also gives low probability of intercept.
No linearity requirements on the transmitter since the reference signal is sampled after the power amplifier.
Simple waveform generation since there are no phase, amplitude or linearity requirements on the waveform generator, but the noisier the better.
Low target area fluctuations since the target-area will be an average value over several frequency sub-bands, which gives lower fluctuations.

A suitable bandwidth of the wideband signal is 10 GHz in the range 8-18 GHz, but other frequency ranges are also possible. The wideband signal is preferably continuous but may be in the form of pulses.

Below you will find some definitions of expressions used in the application.

Wideband ambiguity function. The ambiguity function describes the correlation between a reference and received signal, See equation 9 below.

Coherent noise radar is a method for radar where both phase and amplitude is correlated. In the non-coherent case only the amplitude of the signals is correlated. The present invention may use both types of wideband signals.

BRIEF DESCRIPTION OF DRAWINGS

The invention will below be described in connection to a number of drawings where.

EMBODIMENTS OF THE INVENTION

Figure 1:
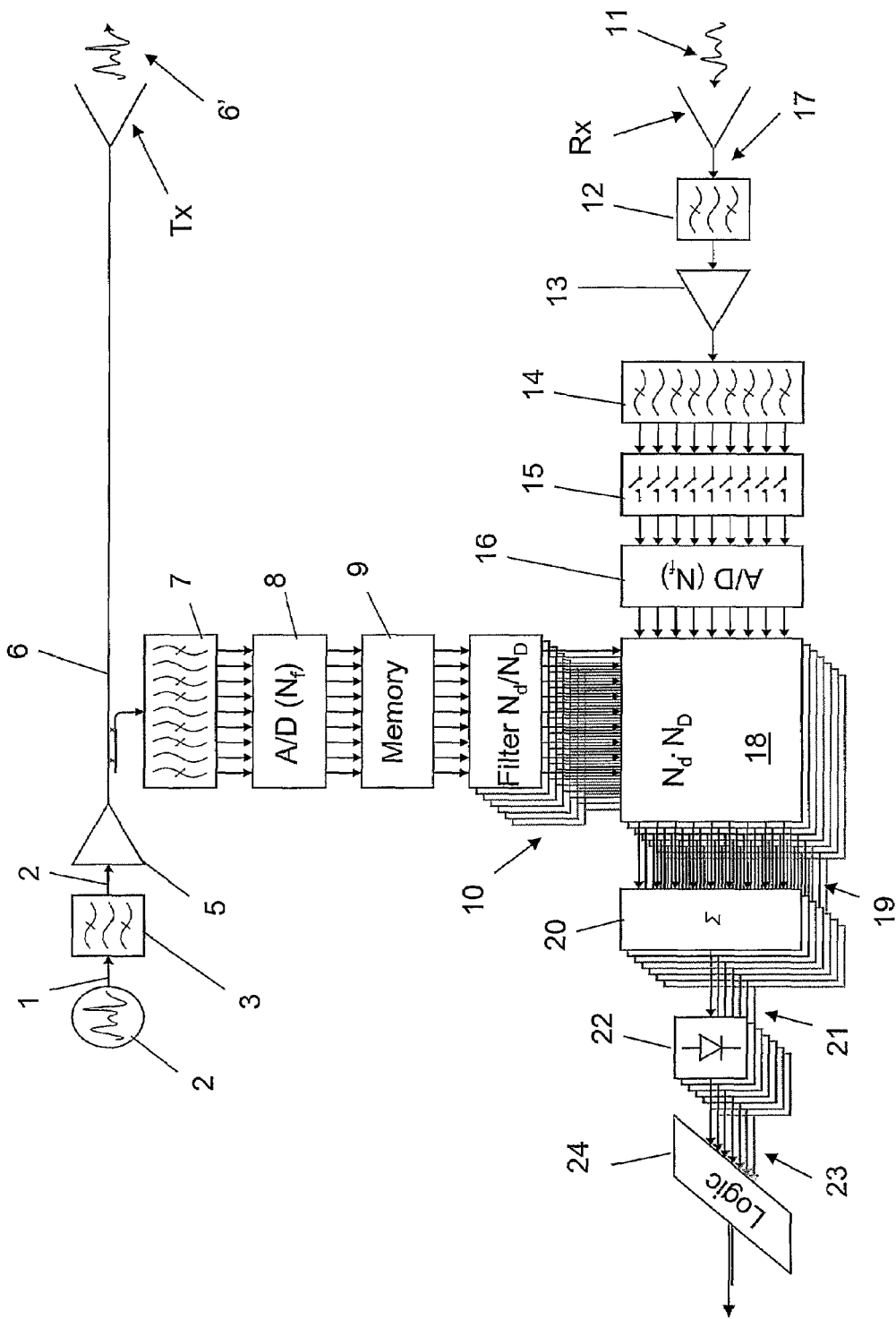
FIG. 1 schematically shows a block diagram over the method and apparatus according to one embodiment of the invention, and where.

FIG. 1 schematically shows a block diagram over the method and the radar and control device according to one embodiment of the invention. A wideband signal 1, with bandwidth B, is generated in a Wideband signal generator 2. The signal 1 is then processed in a band pass filter 3 (BP-filter) in order to remove frequency contents outside a filter bank. The filtered signal 4 is then enhanced in a power amplifier 5 and the enhanced signal 6 is then transmitted 6' via a transmitting antenna Tx.

The enhanced signal 6 is copied after the power amplifier 5 and is then frequency divided by a BP-filter bank 7 into a number of $N_f$ frequency bands. The divided signals are then converted from analog signals into corresponding digital signals in an A/D-converter cluster 8. The A/D converted signals are stored in a Memory 9. The stored signals are then manipulated such that $N_d$ anticipated delays and $N_D$ Doppler stretches are added to the stored signal for each number $N_f$ of frequency bands. This manipulated signal is hereinafter called the anticipated signals 10 and refers to a number of $N_d$ $N_D$ ($N_d$ times $N_D$) filters comprising one filter for each delay, i.e. a number of $N_d$ filters for each delay and one filter for each Doppler stretch, i.e. a number of $N_D$ filters for each Doppler stretch. The number of filters depends on the instrumented range, the range resolution, the velocity limits, the velocity resolution and the number of frequency sub-bands.

Each filter is optimized for one range and one velocity for the generated transmit signal.

A returned echo signal 11 is received by a receiving antenna Rx placed at a distance from the transmitting antenna Tx. The receiving antenna Rx may be placed several kilometers from the transmitting antenna Tx. The received signal 17 is transmitted via a filter 12, in order to exclude out of band signals, to a Low noise amplifier 13 where it is amplified before being transmitted to a filter bank 14. The amplified signal is divided by the filter bank 14 into a number $N_f$ of frequency bands, each with a bandwidth $B/N_f$, corresponding to the division of the copied signal 6. The filter bank may comprise a number $N_f$ of BP-filters. The frequency bands do not have to be of equal size, but may be of different size, i.e. some frequency bands may have a greater bandwidth than other frequency bands. However, the frequency bands in the received and divided signal need to be divided in the same manner as the copied signal.

The divided signal is transmitted through a switch cluster 15 comprising a number of $N_f$ switches. The switch cluster can be used to clear a signal that is evidently wrong. For example, all jammed frequency sub bands will be excluded in the calculation of the average value by opening the correct switches in the switch cluster.

The switched signal is converted by an A/D-converter 16 into a digital received signal.

The digital received signal is correlated with the anticipated signals 10 for corresponding frequency bands in a correlation cluster 18. The anticipated signals 10 corresponds to the filters representing each anticipated delay $N_d$ and each anticipated Doppler stretched $N_D$. Hence, the correlator cluster 18 correlates the anticipated signals 10 and the digital received signals. Correlation refers to the process of comparing anticipated signals with received signals. If there is a match the correlation cluster reveals the location of a target in the range-velocity plane. The correlation may be done, for example, by multiplication, where the product for a match between an anticipated signal 10 and a digital received signal yields a high value and where a mismatch yields a low value. The received signal may be weaker or somewhat different from the anticipated signal, but a match between an anticipated signal and a received signal gives a significantly higher value than for a mismatch correlation between the signals.

Furthermore, the invention is not limited to digital signals, but it is possible to arrange the correlation cluster to be able to handle analog signals as well as optical signals. In the latter cases, the match may then present itself as, for example, an interference value that is possible to detect.

The output from the correlation cluster is a number of $N_d$ $N_D$ correlated signals 19 for each combination of delay and Doppler stretch. The $N_d$ $N_D$ correlated signals 19 for each combination of delay and Doppler stretch are then averaged in an averaging means 20 into a number of $N_f$ average signals 21. The average of the $N_f$ average signals 21 gives a good estimate of the echo return for each range (delay) and velocity (Doppler Stretch) combination. The number of filters depends on the instrumented range, the range resolution, the velocity limits, the velocity resolution and the number of frequency sub-bands.

In FIG. 1 the average signals 21 are transmitted through a number of $N_f$ detectors 22. A detector is a threshold circuit that gives logical "LOW" output below the threshold level and a logical "HIGH" output above the threshold level. A "LOW" output indicates large probability for "no target present" and a "HIGH" output indicates large probability for "target present". The "HIGH" output may be a discrete value, such as the value one, indicating a target hit or may be a true value indicating a target hit and also the magnitude of the effect in the signal. The "LOW" output may be a discrete value, such as the value zero, indicating that there is no target hit or may be a true value indicating no target hit and also the magnitude of the effect in the signal.

After the detector 22 the detected signals 23 are processed in a logic means 24 which gives an output signal for range-velocity combinations with high probability of a target present. The logic means 24 may in its simplest form be a device that detects the "HIGH" in the detected signals. The logic means 24 finds the "HIGH" and determines from the position in the detected signals 23 in what position in the range-velocity plane the "HIGH", i.e. the target, is found. The output from the logic means 24 may thus be a number of possible target hits and their location in the range-velocity plane.

Figure 2:
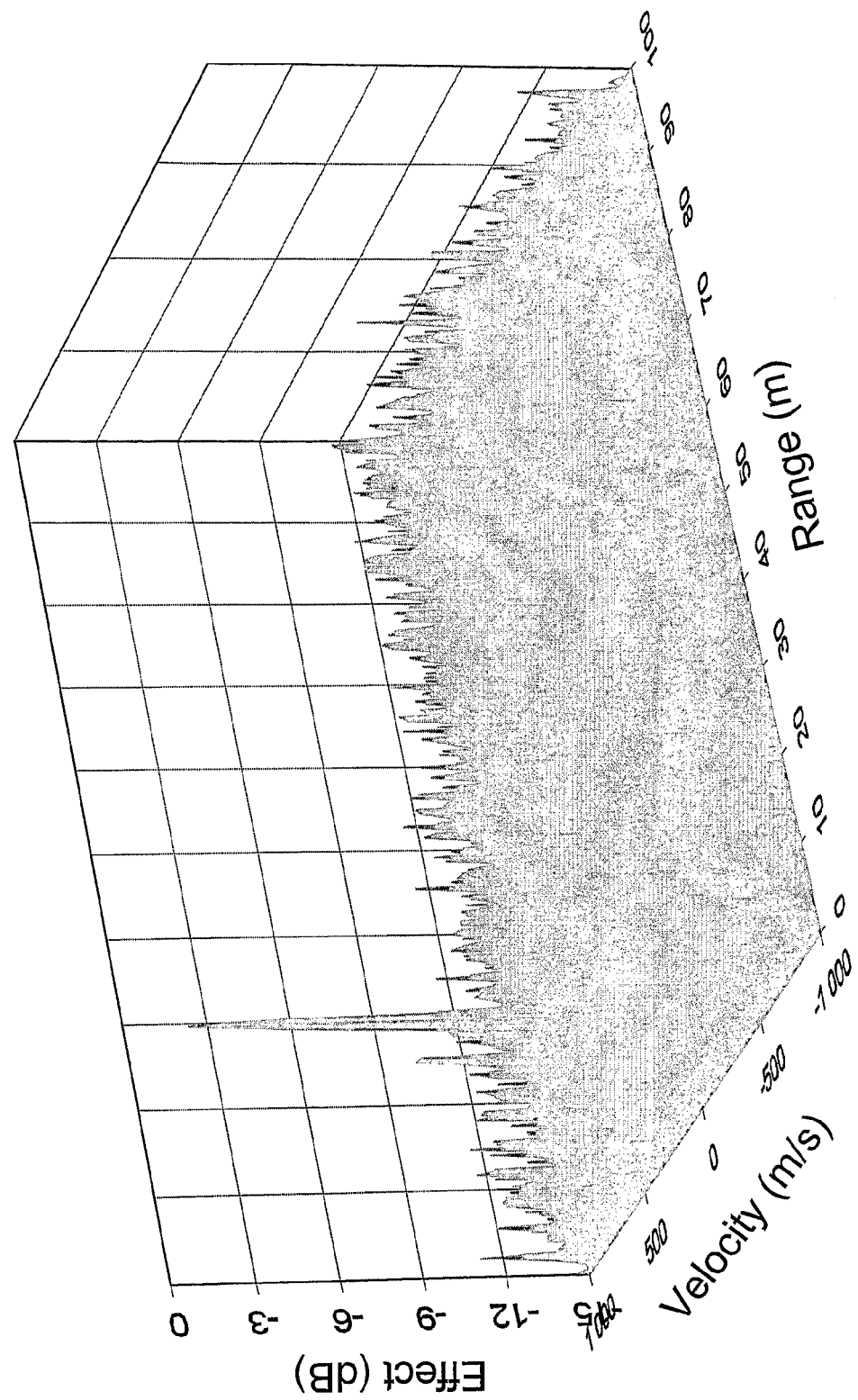
FIG. 2 schematically shows a three dimensional diagram over an example of an output from the method and apparatus according to FIG. 1.

FIG. 2 schematically shows a three dimensional diagram over an example of an output $\chi$ (R, v) from the correlator cluster 18 according to the method and device according to FIG. 1. Here the output $\chi$(R, v) refers to the $N_d$*$N_D$ correlated signals 19. The output $\chi$(R, v) is calculated by use of equation 9 below for determining range (R) to a target and velocity (v) of the target $$\chi(R, v) = D \int_{-\infty}^{\infty} \left[ u\left(\frac{s(c_0 - v_r) - 2R_0}{c_0 + v_r}\right) + n(s) \right] u^*\left(\frac{s(c_0 - v_r) - 2R}{c_0 + v}\right) ds \quad (9)$$

$$\underbrace{\phantom{u\left(\frac{s(c_0 - v_r) - 2R_0}{c_0 + v_r}\right) + n(s)}}_{Received signal} \underbrace{\phantom{u^*\left(\frac{s(c_0 - v_r) - 2R}{c_0 + v}\right)}}_{Anticipated signal}$$

where:

D is the attenuation due to target range and cross section.

n(t) represents added noise.

$R_0$ and $v_r$ are target range and radial velocity respectively. $R_0$ may be defined at different points of time. For example, $R_0$ may be defined at the time of transmittal of the outgoing signal, or at target hit, or at receipt of the echoed signal, i.e. the return signal 11. Dependent on how $R_0$ is defined it is possible to use the inventive method for a specific target homing use, but the definition of $R_0$ is not important in a practical application. It is only of academic interest when comparing different versions of the "Wideband ambiguity function". The target range when the signal is transmitted is very similar to its range when the signal hits the target and also to its range when the signal is received.

R and v are range and velocity variables.
The calculations are made with the following parameters:
Receive antenna SNR equal to 0 dB
Bandwidth B equal to 10 GHz
n(t) is simulated as white noise with bandwidth B.
The generator is a white noise source with bandwidth B.
Band pass filter with bandwidth B.
$N_f$ equal to 100.
Filter banks with 100, 100 MHz filters.
One bit A/D-converters.

In FIG. 2 the simulation shows a result with a Target Range equal to 20 m and Target Velocity=500 m/s. The target hit is indicated by a peak 25 in the diagram indicating the velocity of the target and the range to the target.

Referring to FIG. 2, the detector 22 in FIG. 1 has a threshold that eliminates the noise in the averaged correlated signals 21, and allows only signals above the threshold to pass. For example, the threshold level could be determined to allow only signals with a magnitude of the peak 25 to pass, or may be chosen so as to allow signals of lesser amplitude. Furthermore, the detector may comprise several threshold levels in order to separate signals with different magnitudes which may be a sign of different target sizes. Here, magnitude refers to the effect as displayed in FIG. 2.

It should be noted that the invention is not limited to the use of a detector detecting averaged signals only, but a detector may be used directly on the correlated signals 19.

The invention is not limited to the above embodiment, but may be varied within the scope of the claims. For example, the wideband signal generator could be a noise source. The A/D-converters could have low resolution.

The antennas Tx and Rx must not be placed apart, but in order to achieve a bi-static operation the antennas Tx, Rx must be placed apart in order to increase isolation between them. Placing the antennas apart is also a prerequisite for a continuous operation.

The entire logic structure according to the above embodiment could be performed with other means than for electricity, for example means for manipulating light could be used, where the correlating means could be a junction between a number of light guiding means and where the correlating means uses light interference. Furthermore, different delays (range) could be made by use of light guiding means with different properties, for example length. Different Doppler stretches (velocity) could be made by use of light guiding means with different properties, for example different refractive index. Furthermore, the filter bank could be a Bragg-cell.

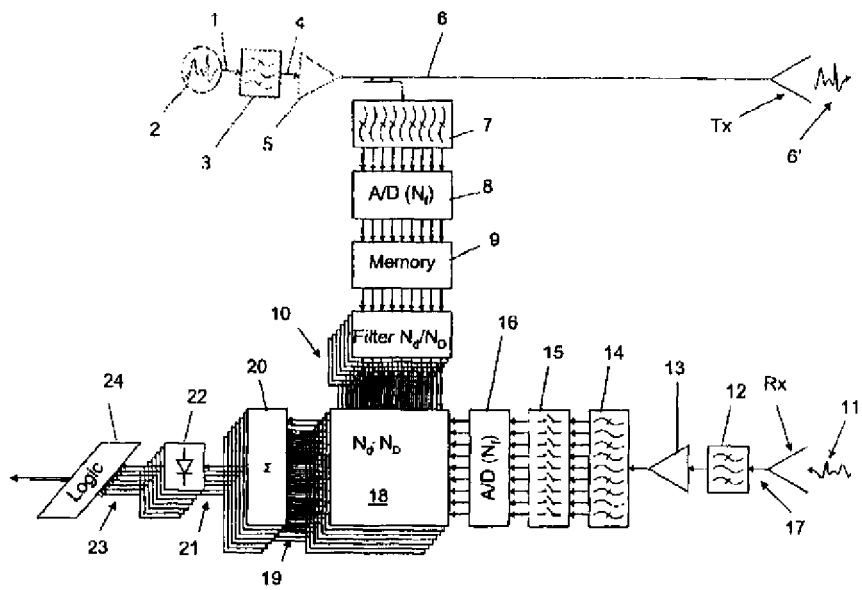

The invention claimed is:

1. A method for wideband radar, the method comprising:
generating a wideband signal with a bandwidth B;
copying the wideband signal;
transmitting the wideband signal;
receiving a returned echo signal from the transmitted signal;
dividing the copied signal into a number, $N_f$, of subsequent frequency bands b;
manipulating the copied and divided signal into an anticipated signal by adding a number $N_d$ of anticipated delays and a number of $N_D$ Doppler stretches to the copied and divided signal for each $N_f$ subsequent frequency band b;
dividing the received signal into a number, $N_f$, of subsequent frequency bands b;
correlating corresponding frequency bands in the divided received signal and the anticipated signal giving $N_d \cdot N_D$ correlated signals for determining range to a target and velocity of the target.

2. A method according to claim 1, comprising the step of calculating the correlated signal by use of:

$$\chi(R, v) = D \int_{-\infty}^{\infty} \left[ u\left(\frac{s(c_0 - v_r) - 2R_0}{c_0 + v_r}\right) + n(s) \right] u^*\left(\frac{s(c_0 - v_r) - 2R}{c_0 + v}\right) ds \quad (9)$$

$\underbrace{\phantom{xxxxxxxxxxxxxxxxxxxx}}_{Received\,signal} \underbrace{\phantom{xxxxxxxxxxxx}}_{Anticipated\,signal}$ for determining range to a target and velocity of the target, where;
D is the attenuation due to target range and cross section;
n(t) represents added noise;
$R_O$ and $v_r$ are target range and radial velocity respectively;

3. A method according to claim 1, comprising the step of averaging the $N_d \cdot N_D$ correlated signals into a number of $N_f$ averaged signals for an estimate of the echo return for each range/delay and velocity/Doppler stretch combination.

4. A method according to claim 3, comprising the step of processing the averaged signals in a detector means giving rise to detector signals comprising at least one logical LOW output below a threshold level and at least one logical HIGH output above the threshold level.

5. A method according to claim 4, comprising the step of processing the detector signals in a logical means determining range to a target and velocity of the target.

6. A method according to claim 1, comprising the step of generating the wideband signal with means of a signal generator.

7. A method according to claim 1, comprising the step of storing the copied and divided wideband signal in a memory.

8. A method according to claim 1, comprising the step of transmitting the generated signal through a filter in order to remove frequency contents outside a filter bank and/or transmitting the received signal through a filter in order to exclude out of band signals.

9. A method according to claim 1, comprising the step of amplifying the generated signal and/or the received signal.

10. A method according to claim 1, comprising the step of transmitting the divided received signal through a switch cluster comprising a number of $N_f$ switches in order to clear a signal that is evidently wrong.

11. A method according to claim 10, comprising the step of converting the switched signal by an A/D-converter into a digital received signal.

12. A method according to claim 1, comprising the step of dividing the stored signal into frequency bands by use of a filter bank for analog signals or digital filters if the stored signal has been converted into a digital signal.

13. A wideband radar, system, comprising:
circuitry operative to:
generate a wideband signal with a bandwidth B;
copy the wideband signal;
transmit the wideband signal;
receive a returned echo signal from the transmitted signal;
divide the copied signal into a number, $N_f$, of subsequent frequency bands b;
manipulate the copied and divided signal into an anticipated signal by adding a number $N_d$ of anticipated delays and a number of $N_D$ Doppler stretches to the copied and divided signal for each $N_f$ subsequent frequency band b;
divide the received signal into a number, $N_f$, of subsequent frequency bands b; and
correlate corresponding frequency bands in the divided received signal and the anticipated signal giving $N_d \cdot N_D$ correlated signals for determining range to a target and velocity of the target.

* * * * *

UNITED STATES PATENT AND TRADEMARK OFFICE
CERTIFICATE OF CORRECTION

PATENT NO. : 7,432,850 B2
APPLICATION NO. : 11/577219
DATED : October 7, 2008
INVENTOR(S) : Falk Page 1 of 2

It is certified that error appears in the above-identified patent and that said Letters Patent is hereby corrected as shown below:

The title page showing the illustrative figure should be deleted to be replaced with the attached title page.

In Fig. 1, Sheet 1 of 2, delete " 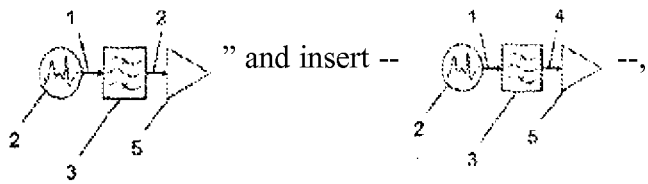 " and insert -- -- , therefor.

Signed and Sealed this

Eighteenth Day of August, 2009

David J. Kappos
*Director of the United States Patent and Trademark Office*

(12) United States Patent
Falk

(10) Patent No.: US 7,432,850 B2
(45) Date of Patent: Oct. 7, 2008

(54) WIDEBAND RADAR

(75) Inventor: Kent Falk, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 3 days.

(21) Appl. No.: 11/577,219

(22) PCT Filed: Oct. 13, 2004

(86) PCT No.: PCT/SE2004/001460

§ 371 (c)(1),
(2), (4) Date: Apr. 13, 2007

(87) PCT Pub. No.: WO2006/041338

PCT Pub. Date: Apr. 20, 2006

(65) Prior Publication Data

US 2007/0247351 A1   Oct. 25, 2007

(51) Int. Cl.
 *G01S 13/58* (2006.01)
 *G01S 13/532* (2006.01)
(52) U.S. Cl. ................................. 342/110; 342/109
(58) Field of Classification Search .......... 342/104, 342/107, 109, 110, 128
See application file for complete search history.

(56) References Cited

U.S. PATENT DOCUMENTS 5,724,041 A * 3/1998 Inoue et al. ............... 342/70
6,121,915 A * 9/2000 Cooper et al. ............. 342/70

OTHER PUBLICATIONS

Dawood, M. et al, "Generalised wideband ambiguity function of a coherent ultrawideband random noise radar" Radar, Sonar and Navigation, IEE Proceedings—vol. 150, Issue 5, Oct. 2, 2003 pp. 379-386 Digital Object Identifier 10.1049/ip-rsn:20030702.*

* cited by examiner

*Primary Examiner* — Ian J Lobo
(74) *Attorney, Agent, or Firm* — Roger S. Burleigh

(57) ABSTRACT

The invention refers to a method and device for wideband radar, the method comprising: — generating a wideband signal (1, 6) with a bandwidth B; —copying the wideband signal (1, 6); —transmitting the wideband signal (6'); receiving a returned echo signal (11) from the transmitted signal (6'); —dividing the copied signal into a number, $N_f$ of subsequent frequency bands b; —manipulating the copied and divided signal into an anticipated signal (10) by adding a number $N_d$ of anticipated delays and a number of $N_D$ Doppler stretches to the copied and divided signal for each $N_f$ subsequent frequency band b; —dividing the received signal (17) into a number, $N_f$, of subsequent frequency bands b; —correlating corresponding frequency bands in the divided received signal (17) and the anticipated signal (10) giving $N_d N_D$ correlated signals (19) for determining range (R) to a target and velocity (v) of the target.

13 Claims, 2 Drawing Sheets